(12) United States Patent
Sako

(10) Patent No.: US 8,970,889 B2
(45) Date of Patent: Mar. 3, 2015

(54) INFORMATION PROCESSING APPARATUS, PRINT SYSTEM CONTROL METHOD, AND STORAGE MEDIUM RECEIVING A SETTING SCREEN FOR SETTING POSITIONAL INFORMATION FROM AN IMAGE FORMING APPARATUS

(71) Applicant: Canon Kabushiki Kaisha, Tokyo (JP)

(72) Inventor: Ritsuto Sako, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/910,923

(22) Filed: Jun. 5, 2013

(65) Prior Publication Data

US 2013/0342869 A1 Dec. 26, 2013

(30) Foreign Application Priority Data

Jun. 26, 2012 (JP) ................................ 2012-142865

(51) Int. Cl.
*G06F 3/12* (2006.01)
*G06K 15/00* (2006.01)
*B41J 29/38* (2006.01)
*H04N 1/00* (2006.01)

(52) U.S. Cl.
CPC ................ *G06K 15/40* (2013.01); *B41J 29/38* (2013.01); *G06K 15/005* (2013.01); *H04N 1/00* (2013.01)

USPC ......... 358/1.15; 358/1.16; 358/1.13; 358/1.1; 400/62

(58) Field of Classification Search
USPC .................................................. 358/1.15, 1.1
See application file for complete search history.

(56) References Cited

U.S. PATENT DOCUMENTS 8,384,940 B2 2/2013 Sako

FOREIGN PATENT DOCUMENTS

JP 2002-244831 8/2002

*Primary Examiner* — Martin Mushambo
(74) *Attorney, Agent, or Firm* — Fitzpatrick, Cella, Harper & Scinto

(57) ABSTRACT

The information processing apparatus receives a screen for setting positional information about an image forming apparatus from the image forming apparatus and displays the screen, acquires positional information about the information processing apparatus in response to the selection of settings for the positional information via the screen by a user, and transmits the acquired positional information about the information processing apparatus to the image forming apparatus. In this manner, the positional information about the information processing apparatus is set as the positional information about the image forming apparatus.

10 Claims, 15 Drawing Sheets

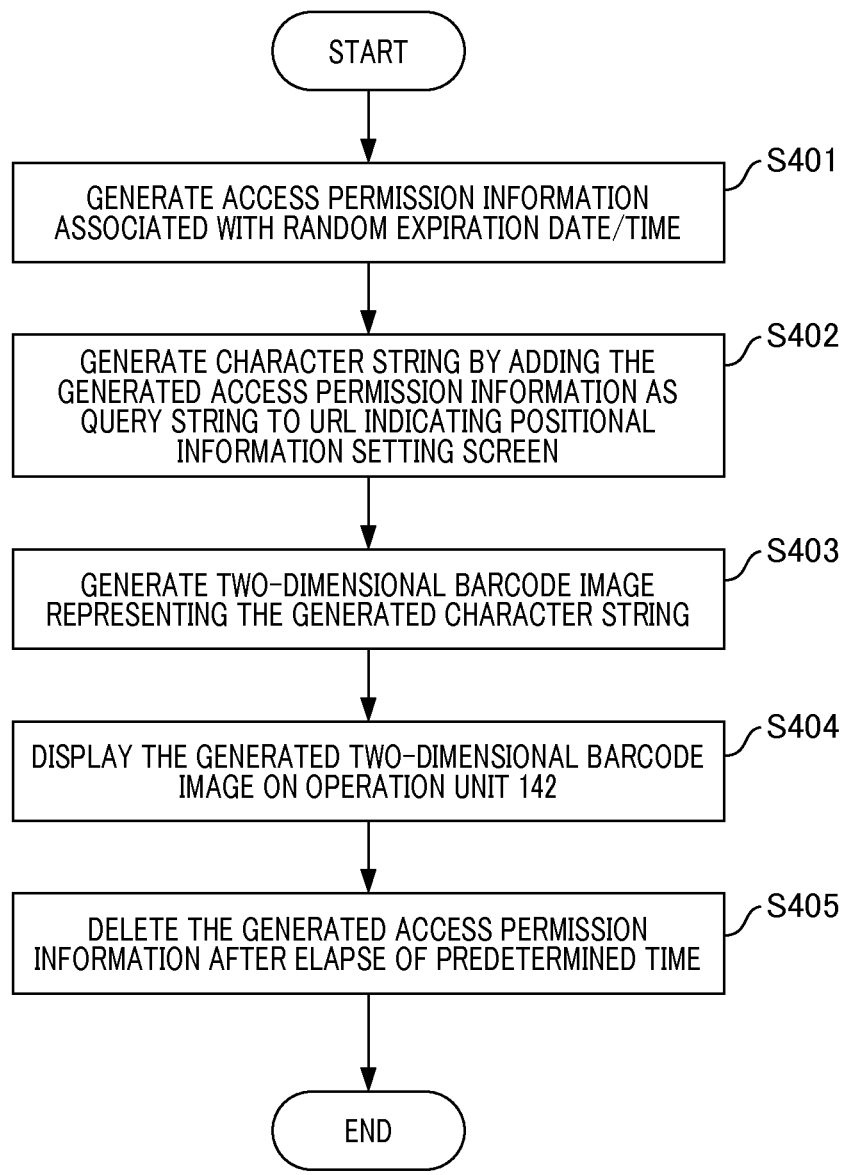

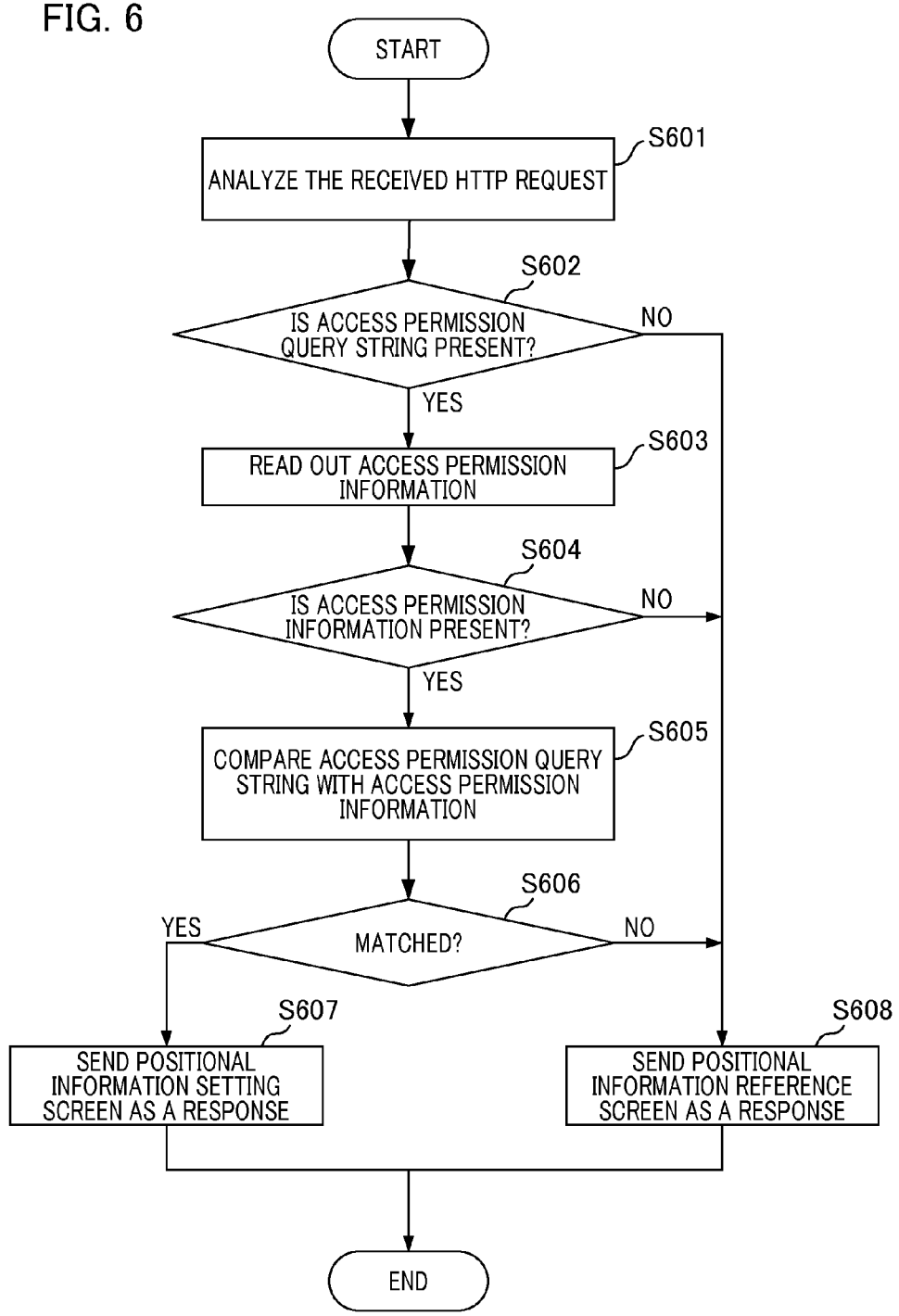

FIG. 7A

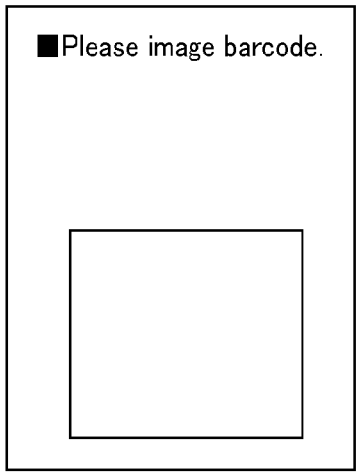

■Please image barcode.

FIG. 7B

■Barcode has been read.
Access to the following address?
http://192.168.1.1/loc_set.cgi?nft= 281868ecf797

FIG. 7C

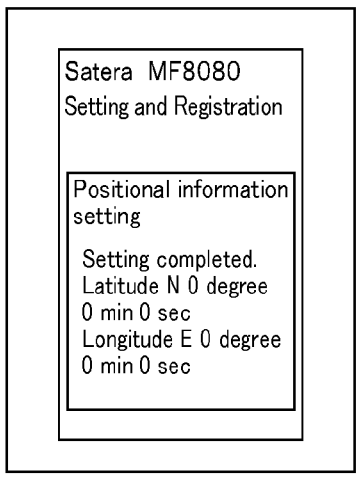

Satera MF8080
Setting and Registration

Positional information setting

Setting completed.
Latitude N 0 degree
0 min 0 sec
Longitude E 0 degree
0 min 0 sec

FIG. 7D

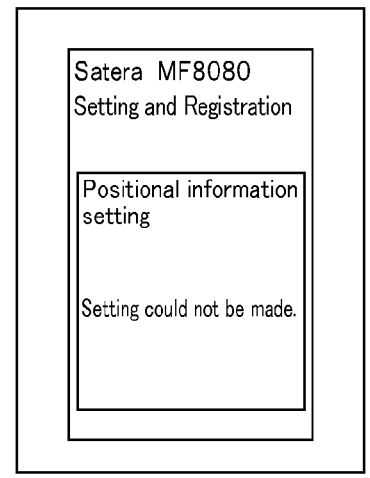

Satera MF8080
Setting and Registration

Positional information setting

Setting could not be made.

FIG. 7E

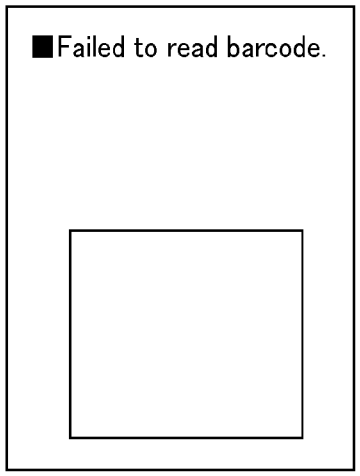

■Failed to read barcode.

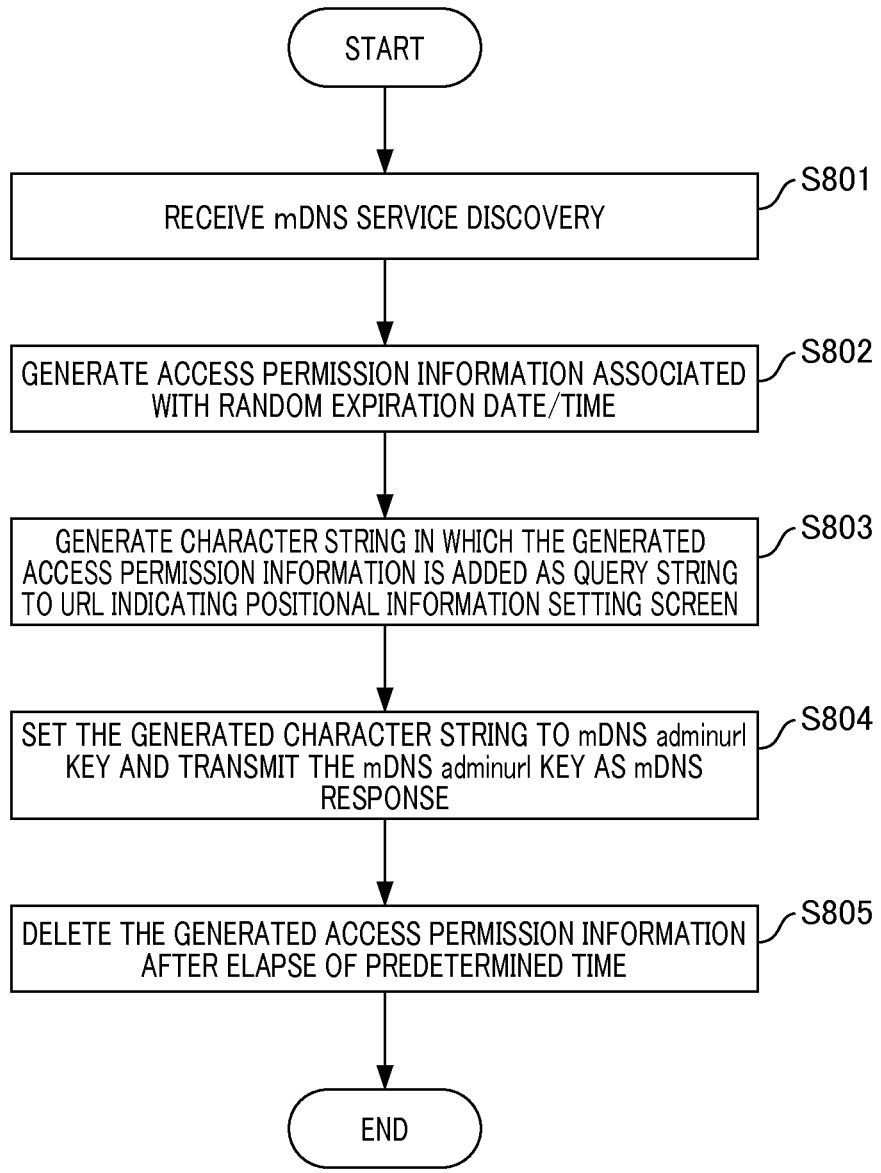

FIG. 11

| DEVICE NAME | adminurl | |
|---|---|---|
| MF8080 | http://192.168.1.1/loc_set?nft= 281868ecf797 | ~1101 |
| iRC3200 | http://192.168.1.2/loc_set?nft= 543809234ac9 | ~1102 |
| LBP5910 | http://192.168.1.3/loc_set | ~1103 |

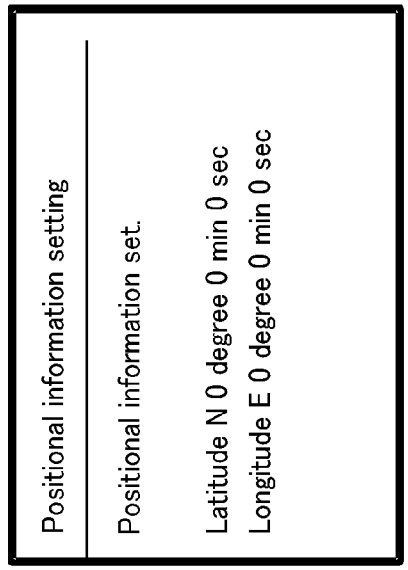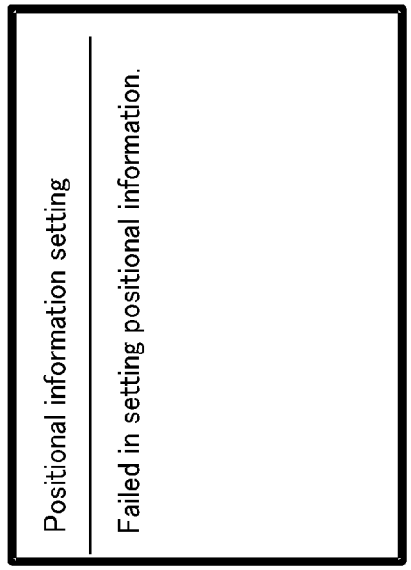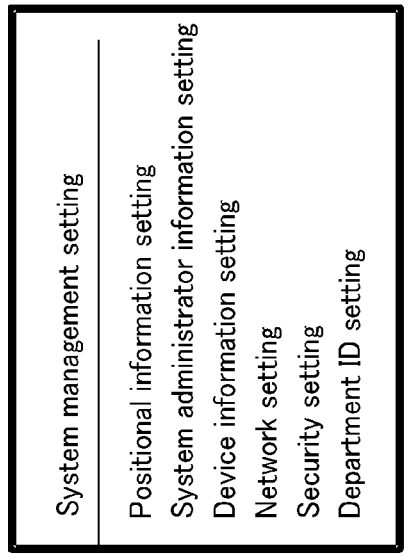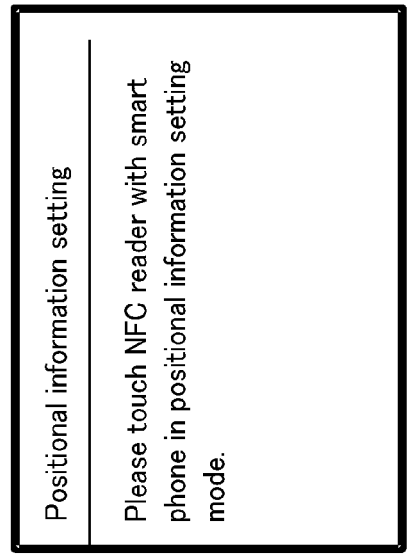

FIG. 13A

■Print device positional
information setting

Positional information
setting is made.
Please touch NFC reader
of print device.

FIG. 13B

■Print device positional
information setting

Succeeded in setting
positional information.

FIG. 13C

■Print device positional
information setting

Failed in setting positional
information.

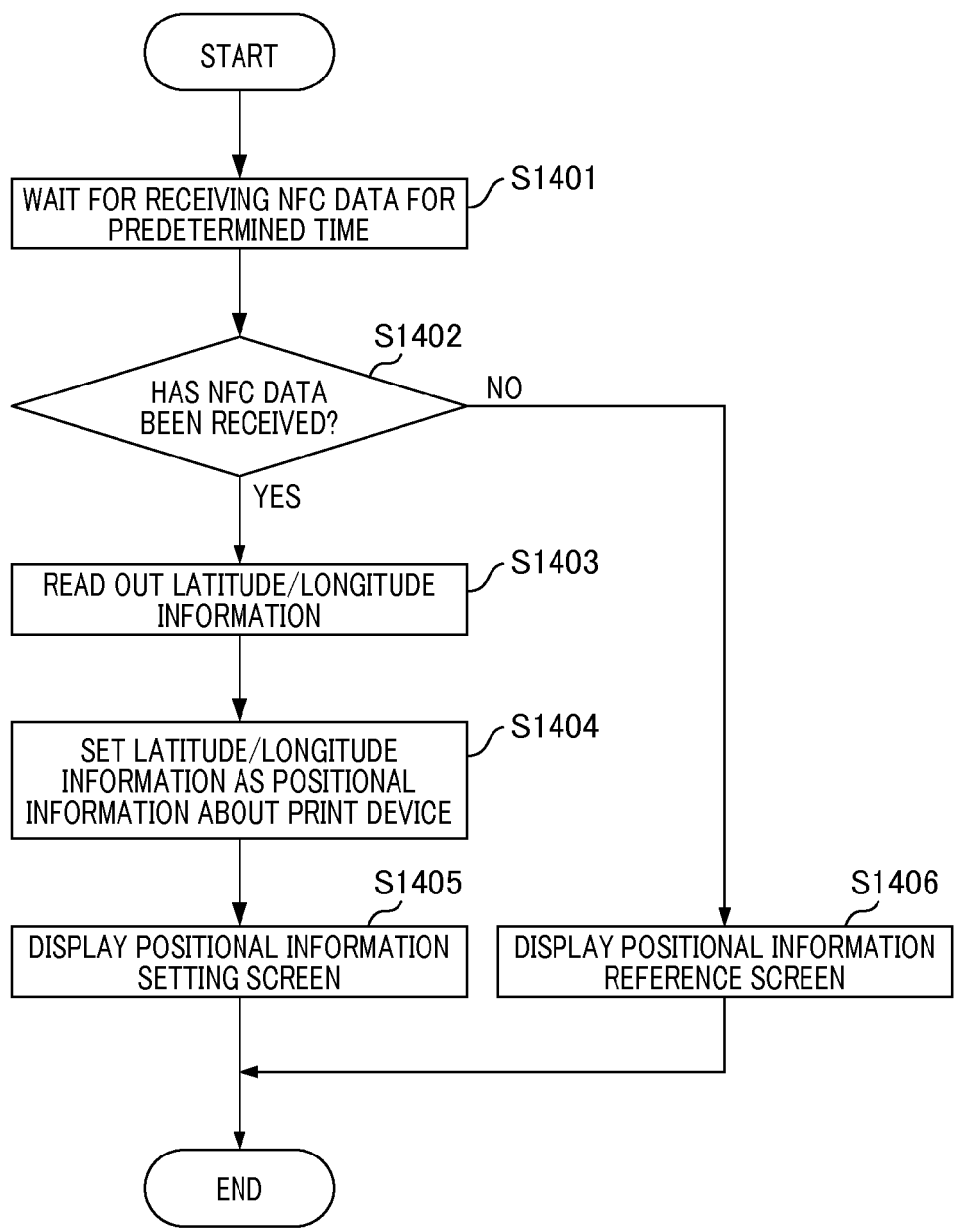

INFORMATION PROCESSING APPARATUS, PRINT SYSTEM CONTROL METHOD, AND STORAGE MEDIUM RECEIVING A SETTING SCREEN FOR SETTING POSITIONAL INFORMATION FROM AN IMAGE FORMING APPARATUS

BACKGROUND OF THE INVENTION

1. Field of the Invention

The present invention relates to an information processing apparatus, an image forming apparatus, a print system control method, and a storage medium.

2. Description of the Related Art

There has been provided a system in which positional information (latitude, longitude) about an image forming apparatus is set to the image forming apparatus and the image forming apparatus informs the positional information via a network so that the client computer can detect a position of the image forming apparatus. In this case, a user needs to set positional information to an image forming apparatus via a UI panel or the like in advance. However, in order for a user to set positional information represented by latitude/longitude data to an image forming apparatus, the user firstly needs to acquire positional information about the image forming apparatus using equipment having a GPS (global positioning system) function. Furthermore, the acquired latitude/longitude information needs to be set to an image forming apparatus in the system of units such as x degree, y min, and z sec. These operations are inconvenient for a user.

On the other hand, in recent years, mobile equipment such as smart phones having a GPS function is becoming commonplace, and thus, it is contemplated that positional information is automatically set by an image forming apparatus itself having a GPS function. However, an image forming apparatus is basically less likely to be moved once the image forming apparatus is installed. Furthermore, in recent years, cost competition for image forming apparatuses has been becoming fierce. Thus, incorporation of a GPS module into an image forming apparatus only for the purpose of setting positional information upon installation of the image forming apparatus is unrealistic.

Japanese Patent Laid-Open No. 2002-244831 discloses a system in which a positional information management server acquires current position from a mobile terminal or a GPS and then reads out a zip code from the acquired current position to thereby search an image forming apparatus registered in a server in advance based on the zip code. In this manner, a user can execute printout from an image forming apparatus in a vicinity of the user via the positional information management server using the GPS function without installing GPS to the image forming apparatus.

However, in the system disclosed in Japanese Patent Laid-Open No. 2002-244831, a positional information management server for managing positional information needs to be newly installed. Thus, a vendor who provides image forming apparatuses needs to prepare and manage a positional information server, resulting in an increase in cost and effort. The precise positional information is hardly obtained by a zip code only.

SUMMARY OF THE INVENTION

The present invention provides an information processing apparatus that enables a user to readily register positional information about an image forming apparatus in the image forming apparatus without providing a server or installing GPS to the image forming apparatus by a vendor.

According to an aspect of the present invention, an information processing apparatus is provided that includes a display unit configured to receive a setting screen for setting positional information about an image forming apparatus from the image forming apparatus and display the setting screen; an acquisition unit configured to acquire positional information about an information processing apparatus in response to the selection of settings for the positional information via the setting screen by a user; and a transmission unit configured to transmit the acquired positional information about the information processing apparatus to the image forming apparatus, wherein, when the transmission unit transmits positional information about the information processing apparatus to the image forming apparatus, the positional information about the information processing apparatus is set as the positional information about the image forming apparatus to the image forming apparatus.

Further features of the present invention will become apparent from the following description of exemplary embodiments with reference to the attached drawings.

BRIEF DESCRIPTION OF THE DRAWINGS

FIG. 4 illustrates processing for displaying a barcode indicating positional information by an image forming apparatus.

FIG. 6 illustrates processing for setting positional information by an image forming apparatus after reception of a positional information setting request.

FIGS. 7A to 7E illustrate screen transition of a terminal device that sets positional information by imaging a barcode.

FIG. 8 illustrates processing for setting a screen via mDNS by an image forming apparatus according to a second embodiment.

FIG. 11 illustrates a device search result list generated by a terminal device using mDNS.

FIGS. 12A to 12D illustrate screen transition until positional information setting is made using NFC by an operation unit of an image forming apparatus according to a third embodiment.

FIGS. 13A to 13C illustrate screen transition on a terminal device until positional information setting is made using NFC.

FIG. 14 illustrates processing for setting positional information by an image forming apparatus after reception of positional information via NFC.

DESCRIPTION OF THE EMBODIMENTS (First Embodiment)

Figure 1:
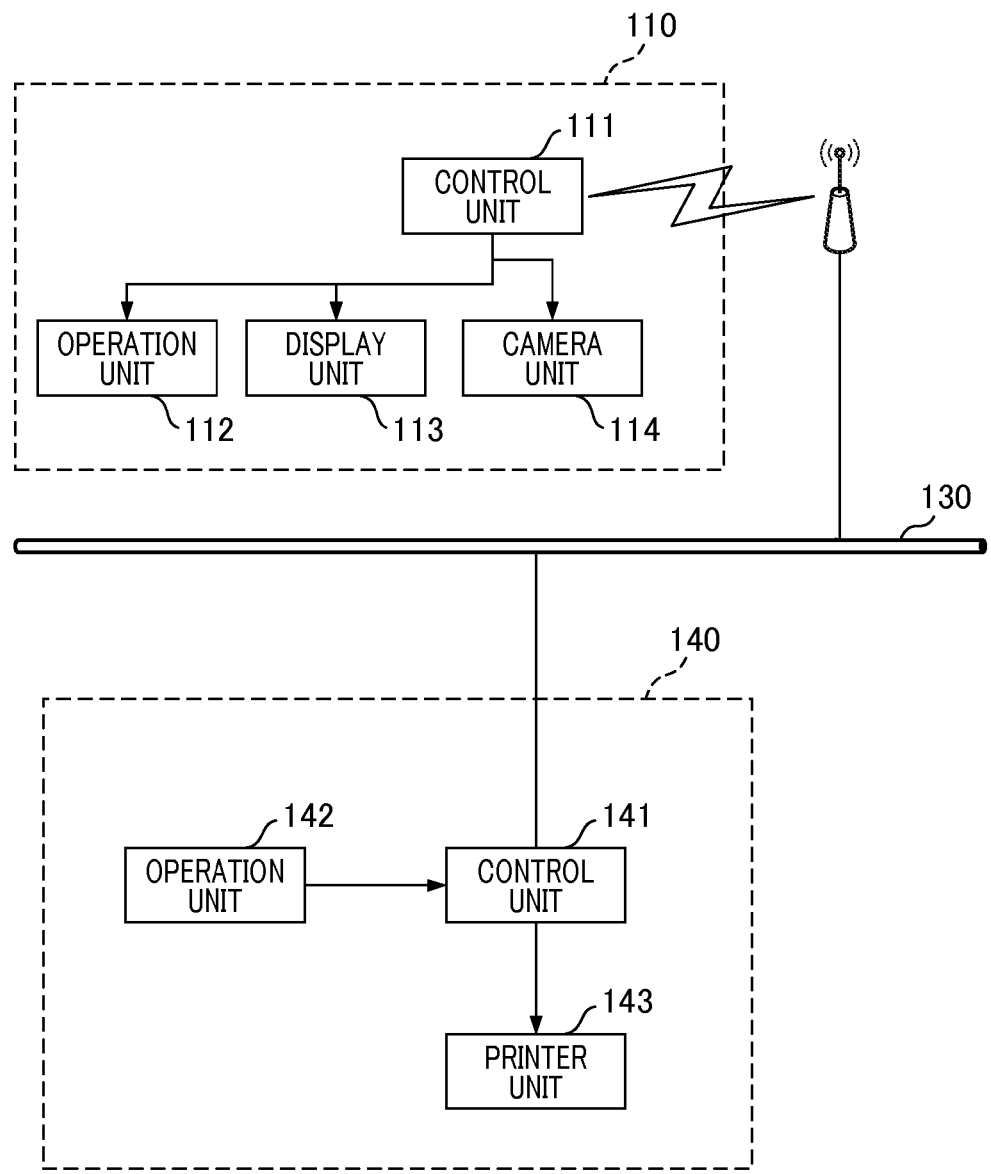
FIG. 1 illustrates an exemplary configuration of a print system according to one embodiment of the present invention.

FIG. 1 is a diagram illustrating a configuration of a print system of the present embodiment. The print system includes an information processing apparatus 110 and an image forming apparatus 140. The information processing apparatus 110 can transmit a print instruction to the image forming apparatus 140 via a network. While, in the present embodiment, a description will be given by taking an example of a case of using a mobile terminal such as a smart phone as the information processing apparatus 110, positional information may also be registered from a tablet terminal or a PC having a GPS function and a barcode reading function. In the print system, the information processing apparatus 110 serving as a client computer is connected to an access point 120. The access point 120 is connected to a LAN 130. The information processing apparatus 110 is communicably connected to the image forming apparatus 140 via the access point 120 and the LAN 130. Furthermore, the information processing apparatus 110 communicates with the image forming apparatus 140 via an HTTP protocol.

The information processing apparatus 110 includes a control unit 111, an operation unit 112, a display unit 113, and a camera unit 114. The control unit 111 connects to the operation unit 112, the display unit 113, and the camera unit 114 to thereby control these processing units. The operation unit 112 receives an instruction from a user in various types of screens displayed on the display unit 113. When the information processing apparatus 110 has a physical medium such as a keyboard, ten keys, or the like, the operation unit 112 can also receive a user instruction via these physical media. The display unit 113 displays various types of screens to be described below with reference to FIG. 5, FIG. 7, FIG. 9, and FIG. 13. The camera unit 114 has an imaging function and images a barcode or the like displayed on the display of the image forming apparatus 140. The control unit 111 activates a program generally called a "browser" for executing HTTP communication in accordance with a user instruction input via the operation unit 112 to thereby perform HTTP communication with the image forming apparatus 140.

The image forming apparatus 140 includes a control unit 141, an operation unit 142, and a printer unit 143. The control unit 141 executes various programs installed in the control unit 141 to thereby control the operation unit 142 and the printer unit 143. The operation unit 142 is a user interface (UI) that accepts a user instruction relating to various types of processing such as print processing, scan processing, copy processing, or the like. The printer unit 143 executes the aforementioned various types of processing via a user or an information processing apparatus such as a mobile terminal operated by a user.

Figure 2:
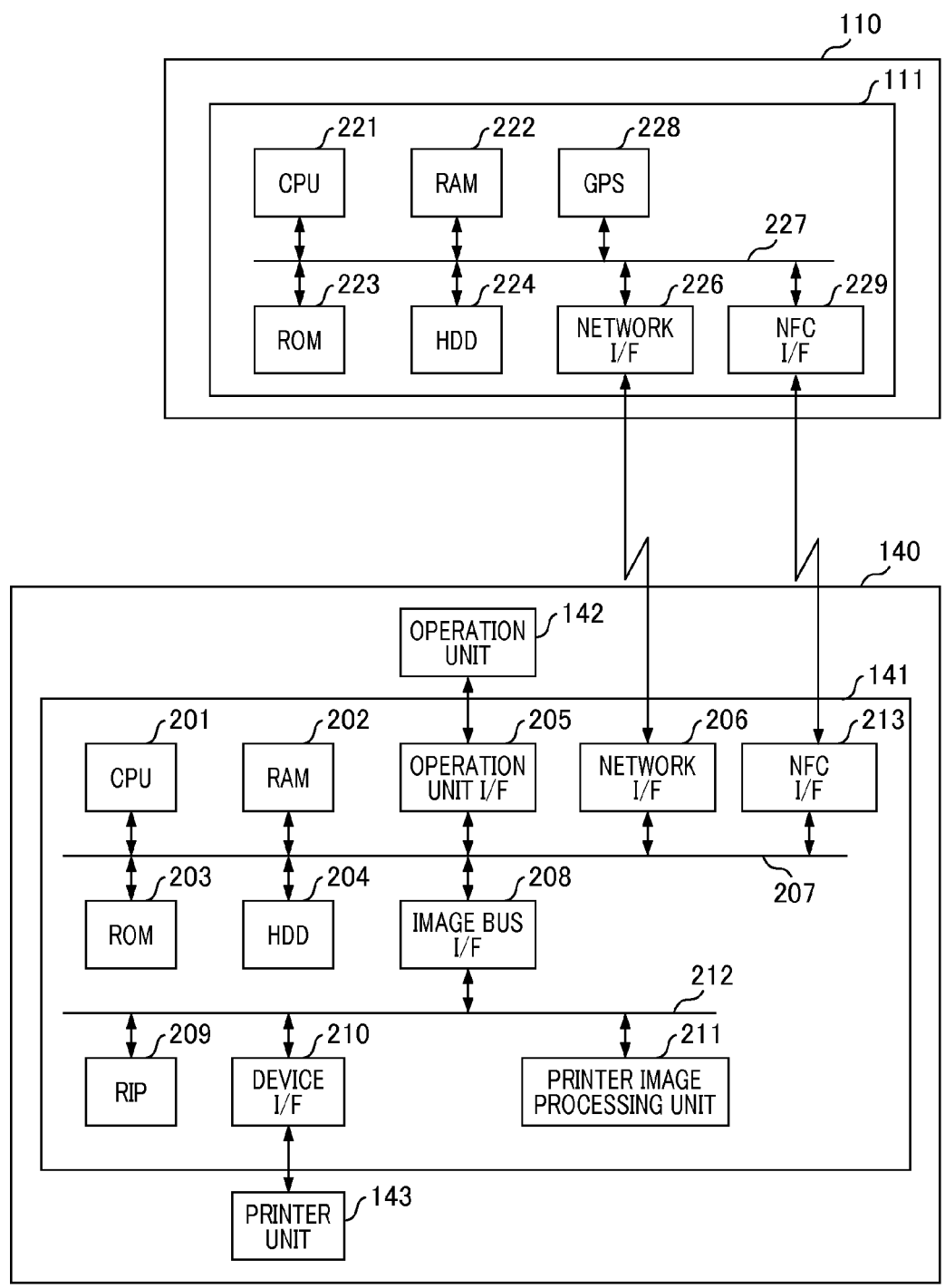
FIG. 2 illustrates a hardware configuration of units constituting a print system and a server group.

Next, a description will be given of hardware configuration of the control unit 111 of the information processing apparatus 110 and the control unit 141 of the image forming apparatus 140 with reference to FIG. 2. FIG. 2 is a block diagram illustrating the information processing apparatus 110 and the image forming apparatus 140. The control unit 111 of the information processing apparatus 110 includes a CPU 221, a RAM 222, a ROM 223, an HDD 224, and a network I/F (network interface) 226. The control unit 111 also includes a GPS 228 and an NFC I/F (Near Field Communication interface) 229. Note that CPU is an abbreviation for Central Processing Unit, RAM is an abbreviation for Random Access Memory, and ROM is an abbreviation for Read Only Memory.

The ROM 223 stores a control program for controlling the operation of the operation unit 112, the display unit 113, and the camera unit 114 by the control unit 111. The HDD 224 stores a program for establishing connection to the access point 120 and a program for analyzing a barcode image by the information processing apparatus 110. Also, the HDD 224 stores a program for acquiring positional information about itself via GPS, an HTTP communication program for performing HTTP communication with the image forming apparatus 140, and a near field communication program for performing near field communication with the image forming apparatus 140. The device configuration shown in FIG. 2 is just an example and the present invention is not limited to an exemplary configuration shown in FIG. 2. For example, a storage location in which data or programs are stored may be any one of the ROM 223, the RAM 222, and the HDD 224 depending on the feature of data or programs.

The CPU 221 controls the operation of the operation unit 112 and the display unit 113 by reading out the control program stored in the ROM 223 to the RAM 222 and analyzing and executing the control program. The CPU 221 also executes connection to the access point 120 by reading out the access point connecting program stored in the HDD 224 to the RAM 222 and analyzing, and executing the program. The CPU 221 also restores data by reading out the barcode image analyzing program stored in the HDD 224 to the RAM 222 and analyzing and executing the program. Furthermore, the CPU 221 executes HTTP communication with the image forming apparatus 140 by reading out the HTTP communication program stored in the HDD 224 to the RAM 222 and analyzing and executing the program. In addition, the CPU 221 executes acquisition processing for acquiring positional information about itself by reading out a positional information acquiring program stored in the HDD 224 to the RAM 222 and analyzing and executing the program.

The aforementioned processing units are connected to each other via a system bus 227. The network I/F 226 is connected to the LAN 130 via the access point 120 and is connected to the network I/F 206 of the image forming apparatus 140 via the LAN 130 to thereby perform HTTP communication. The NFC I/F 229 functions as a communication unit that is connected to an NFC I/F 213 of the image forming apparatus 140 to thereby perform near field communication.

The control unit 141 of the image forming apparatus 140 includes a CPU 201, a RAM 202, a ROM 203, an HDD 204, an operation unit I/F 205, a network I/F 206, an NFC I/F 213, and an image bus I/F 208. Also, the control unit 141 includes a RIP 209, a device I/F 210, and a printer image processing unit 211. The control unit 141 is electrically connected to the printer unit 143 and is connected to the information processing apparatus 110 or the like via the LAN 130. In this manner, the input and output of a file such as image data and image forming apparatus information can be made. The processing units 201 to 206, 208, and 213 are connected to each other via a system bus 207. The image bus I/F 208 is connected to the RIP (Raster Image Processor) 209, the device I/F 210, and the printer image processing unit 211 via an image bus 212.

The CPU 201 integrally controls an access to various types of connected devices based on the control program or the like stored in the ROM 203 and also integrally controls various types of processing to be performed inside the control unit 141. The RAM 202 is a system work memory for operating the CPU 201 and is also a memory for temporarily storing image data. The RAM 202 is constituted by a non-volatile static random access memory (SRAM) for storing the stored content after the electric power is turned off and a dynamic random access memory (DRAM) in which the stored content is deleted after the electric power is turned off. The ROM 203 stores a boot program for the image forming device and the like. The HDD 204 is a hard disk drive that stores system software and image data. In the present embodiment, the HDD 204 stores a program for outputting a barcode and a program for setting positional information by receiving a positional information setting request from the information processing apparatus 110. Also, the HDD 204 stores a program to be executed upon reception of an mDNS service discovery and a program for setting positional information by receiving a positional information setting request via an NFC. The CPU 201 executes various types of processing by reading out these programs to the RAM 202 and analyzing and executing these programs.

The operation unit I/F 205 is an interface unit that connects the system bus 207 with the operation unit 142. The operation unit I/F 205 outputs image data to the operation unit 142 after receiving image data for display on the operation unit 142 from the system bus 207 and outputs information input from the operation unit 142 to the system bus 207. The network I/F 206 is connected to the LAN 130 and the system bus 207 to perform the input and output of information. Also, the network I/F 206 is connectable to the network I/F 226 of the information processing apparatus 110 via the LAN 130 to perform network communication. The NFC I/F 213 is connected to the NFC I/F 229 of the information processing apparatus 110 to perform near field communication. The image bus I/F 208 is an interface that connects the system bus 207 with the image bus 212 for high-speed image data transfer and operates as a bus bridge for data structure conversion. The image bus 212 is a transmission path for transmitting and receiving image data and is constituted by a peripheral component interconnect (PCI) bus or an Institute of Electrical and Electronic Engineers (IEEE) 1394 bus.

The RIP 209 generates raster data based on display list (DL) generated by converting page description language (PDL) data received from the network I/F 206 by the CPU 201. The device I/F 210 is an interface that connects the printer unit 143 with the control unit 141, executes synchronous/asynchronous conversion of the image data, and temporarily stores input/output data in a buffer memory (not shown). The printer image processing unit 211 performs processing such as color conversion, filter processing, resolution conversion, and the like on output image data to be output to the printer unit 143.

Figure 3A:
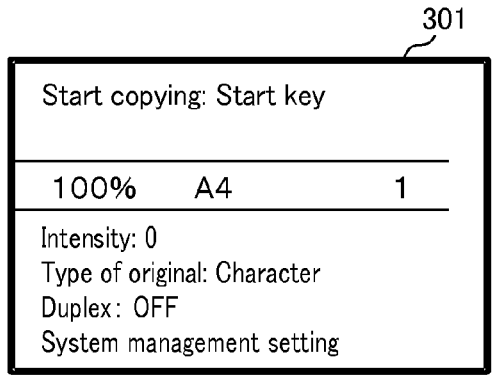
FIGS. 3A to 3D illustrate a barcode and an URL indicating a positional information setting screen to be displayed on an operation unit of an image forming apparatus according to a first embodiment.
Figure 3B:
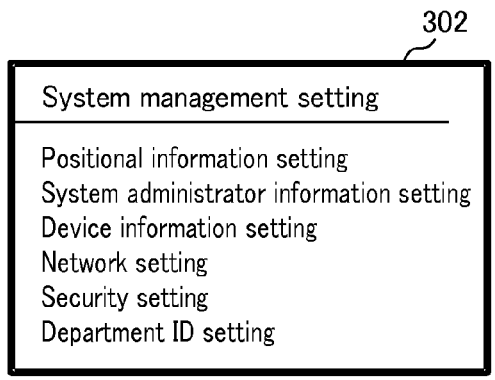
Figure 3C:
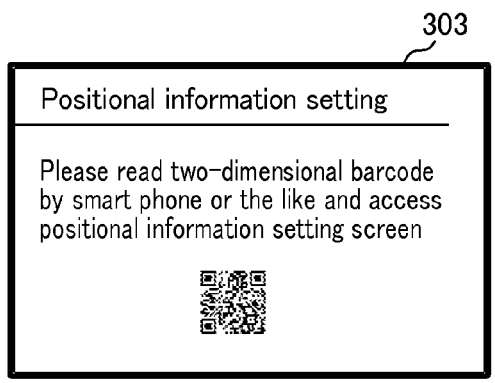

Next, a description will be given of a barcode display operation performed by the operation unit 142 of the image forming apparatus 140 of the present embodiment with reference to FIG. 3. FIGS. 3A to 3D illustrate various types of screens displayed on the operation unit 112 of the image forming apparatus 140. When a user selects a system management setting in an initial screen (FIG. 3A), a transition from the initial screen to a system management setting screen (FIG. 3B) occurs. The system management setting screen (FIG. 3B) is a top screen to a menu for making the general settings of the device and a positional information setting menu is also arranged in the system management setting screen. When a user selects the positional information setting in the system management setting screen (FIG. 3B), the operation unit 142 displays a positional information setting screen (FIG. 3C). At this time, the control unit 141 of the image forming apparatus 140 generates access permission information associated with a random expiration date/time. Also, the control unit 141 executes an HTTP communication program that functions as a built-in Web server to thereby generate a URL for accessing a setting screen for setting positional information. The control unit 141 generates information in which access permission information is added to the URL serving as access information as a two-dimensional barcode. In other words, the control unit 141 functions as a generation unit that generates access information for accessing a setting screen for setting positional information about the image forming apparatus.

Figure 3D:
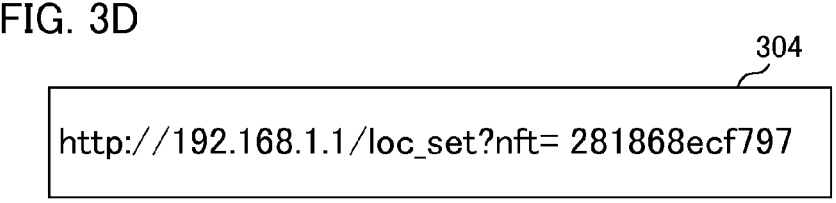

The operation unit 142 displays a two-dimensional barcode on the positional information setting screen (FIG. 3C). FIG. 3D illustrates an exemplary URL indicating a positional information setting screen to which a query string has been added. Here, http://192.168.1.1/loc set is an URL for accessing the built-in Web server of the image forming apparatus 140. Also, "?nft=281868ecf797" is a query string for indicating access permission information. Here, although a description has been given by taking an example in which a two-dimensional barcode is displayed on the operation unit 142, the printer unit 143 of the image forming apparatus 140 may also print a two-dimensional barcode image. While, in the present embodiment, a transition from the initial screen (FIG. 3A) to the system management setting screen (FIG. 3B) occurs through the selection of the system management setting by a user, the present invention is not limited thereto. When the system management setting can only be made by a user who has administrator rights, an authentication processing screen or the like may be displayed prior to transition from the initial screen (FIG. 3A) to the system management setting screen (FIG. 3B).

Next, a description will be given of processing up until the display of a barcode by the operation unit 142 of the image forming apparatus 140 of the present embodiment with reference to FIG. 4. More specifically, the processing is executed by the image forming apparatus 140 when a user selects the positional information setting on the system management setting screen described with reference to FIG. 3B.

In step S401, when a user selects the positional information setting in the system management setting screen (FIG. 3B), the control unit 141 of the image forming apparatus 140 generates access permission information associated with a random expiration date/time. In step S402, the control unit 141 generates a character string by adding the generated access permission information (?nft=281868ecf797) as a query string to the URL indicating the positional information setting screen. In step S403, the control unit 141 generates a two-dimensional barcode image representing the character string based on the generated character string. In step S404, the control unit 141 causes the operation unit 142 to display the generated two-dimensional barcode image. In step S405, the control unit 141 deletes the generated access permission information after elapse of a predetermined time.

Here, although it is preferable that the predetermined time is as short as possible in view of security, it is necessary to set a time long enough for a user to be able to perform an operation for accessing the URL indicating the positional information setting screen by reading the two-dimensional barcode displayed on the information processing apparatus 110. In the case of a normal operation, a reasonable amount of time is about 5 min as an example. Thus, in the present embodiment, a time during which the two-dimensional barcode is displayed on the positional information setting screen (FIG. 3C) may be the predetermined time and access permission information may be deleted upon deletion of display of the two-dimensional barcode. Access permission information may also be deleted upon closing a display screen by a user who has terminated the imaging of the two-dimensional barcode through button selection. Of course, the deletion time of the two-dimensional barcode may not be the same as the deletion time of access permission information. The control unit 141 may also hold only access permission information and delete access permission information after elapse of a predetermined time after deletion of the two-dimensional barcode.

Figure 5A:
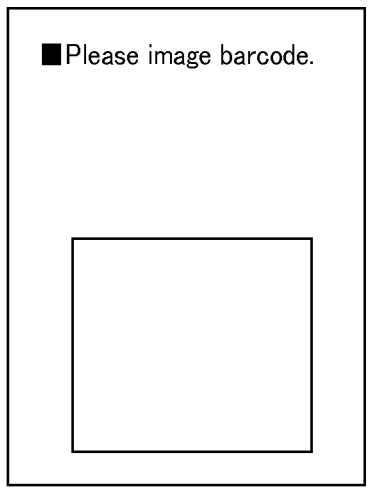
FIGS. 5A to 5G illustrate screen transition of a terminal device for setting positional information by imaging a barcode.
Figure 5B:

Next, a description will be given of screen transition up until the information processing apparatus 110 of the present embodiment sets positional information by imaging the two-dimensional barcode by a user operation with reference to FIG. 5. The display unit 113 of the information processing apparatus 110 displays a barcode imaging screen (FIG. 5A). A user takes a picture of the two-dimensional barcode image displayed on the operation unit 142 of the image forming apparatus 140 described with reference to the positional information setting screen shown in FIG. 3C or the two-dimensional barcode image printed by the printer unit 143 of the image forming apparatus 140 via the camera unit 114.

When the control unit 111 of the information processing apparatus 110 successfully analyzes the barcode taken by the camera unit 114, the display unit 113 displays URL information on a barcode analysis result display screen (FIG. 5B) so as to prompt a user to provide access permission to the URL. When a user selects the URL, the control unit 111 of the information processing apparatus 110 accesses the control unit 141 of the image forming apparatus 140 via the network I/Fs 226 and 206. At this time, the control unit 141 of the image forming apparatus 140 confirms whether or not the access permission query string received from the information processing apparatus 110 is valid. When the access permission query string is valid, the control unit 141 transmits a positional information setting screen (FIG. 5C) and JavaScript (registered trademark) for setting positional information to the information processing apparatus 110. When the access permission query string is invalid, the control unit 141 transmits a positional information reference screen (FIG. 5D) to the information processing apparatus 110.

Figure 5C:
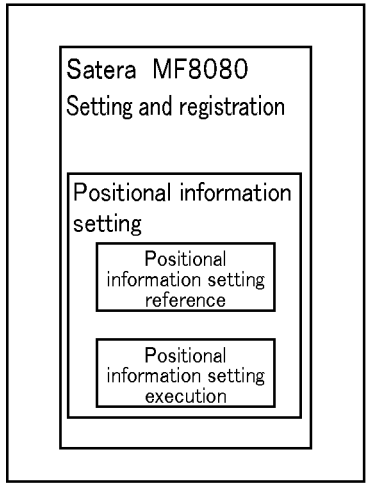
Figure 5D:
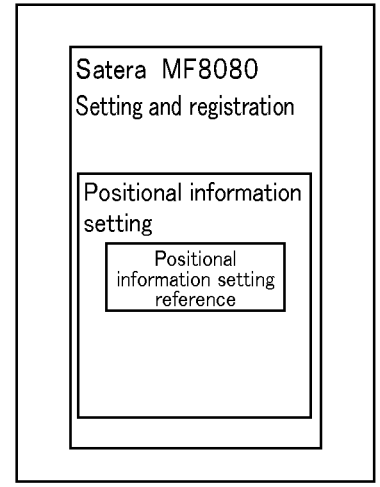
Figure 5E:
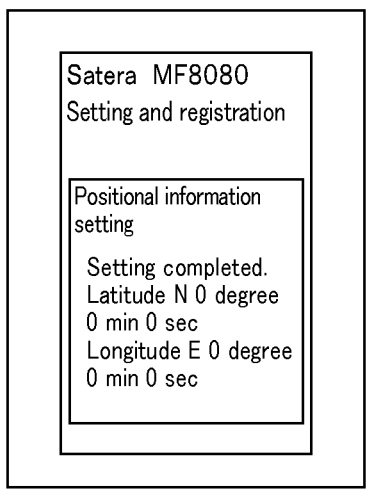
Figure 5F:
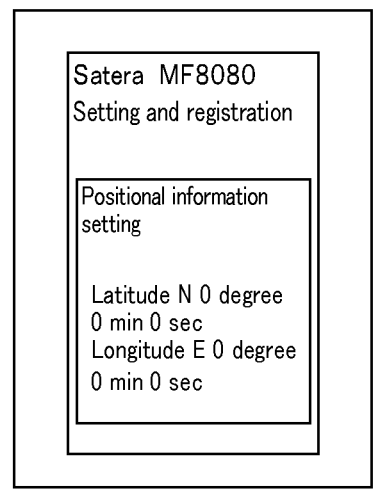
Figure 5G:
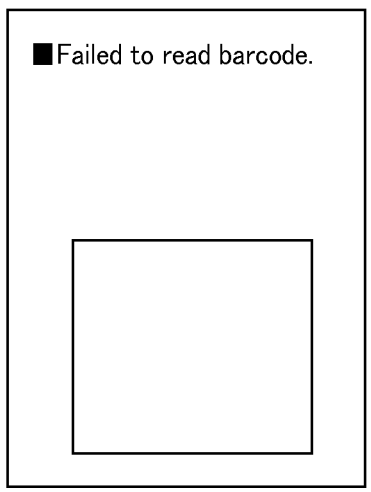

The display unit 113 displays a positional information setting reference key and a positional information setting execution key on the positional information setting screen (FIG. 5C). In other words, the display unit 113 functions as a display unit that receives, from the image forming apparatus, a setting screen for setting positional information about an image forming apparatus and displays it. When a user presses the positional information setting reference key, the GPS 228 of the control unit 111 acquires positional information about the information processing apparatus 110, and the display unit 113 displays a positional information reference screen (FIG. 5F). In other words, the control unit 111 functions as an acquisition unit that acquires positional information about an information processing apparatus in response to the selection of settings for the positional information via a screen by a user. When a user presses the positional information setting execution key on the positional information setting screen (FIG. 5C), the control unit 111 functions as a transmission unit that acquires positional information via the GPS 228 and transmits the acquired positional information to the image forming apparatus 140.

More specifically, when a user presses the positional information setting execution key, the control unit 111 of the information processing apparatus 110 executes JavaScript (registered trademark) for setting positional information. JavaScript (registered trademark) is simultaneously received when the control unit 141 of the image forming apparatus 140 transmits the positional information setting screen (FIG. 5C) to the information processing apparatus 110. JavaScript (registered trademark) includes a script with which the information processing apparatus 110 acquires positional information about the information processing apparatus 110 using API such as Geolocation API. Also, JavaScript (registered trademark) includes a script with which the information processing apparatus 110 returns the acquired positional information about the information processing apparatus 110 by use of API to the image forming apparatus 140. Furthermore, JavaScript (registered trademark) may include a script with which the information processing apparatus 110 acquires positional information when a user presses the positional information setting execution key. Of course, the present invention is not limited to these scripts but may include any script. The control unit 141 executes the aforementioned JavaScript (registered trademark), so that the labor for acquiring positional information about the information processing apparatus 110 using GPS and transmitting the acquired positional information to the image forming apparatus 140 by a user himself can be reduced. Consequently, a user can set positional information in a simple way. When the information processing apparatus 110 transmits the acquired positional information to the image forming apparatus 140, the image forming apparatus 140 receives the positional information, sets it as positional information about the image forming apparatus, and sends a positional information setting completion screen (FIG. 5E) indicating the setting results as a response to the information processing apparatus 110.

When the access permission query string is invalid, the display unit 113 displays the positional information reference screen (FIG. 5D) which is a default screen. Only the positional information setting reference key is displayed on the positional information reference screen (FIG. 5D) so that the positional information setting cannot be executed on the positional information reference screen (FIG. 5D). Instead of the positional information reference screen (FIG. 5D), the display unit 113 may display a screen including a message indicating that access permission information is invalid. Also, when the control unit 111 of the information processing apparatus 110 fails to analyze the photographed barcode, a barcode analysis failure screen (FIG. 5G) is displayed.

Next, a description will be given of the flow of processing for setting positional information by the image forming apparatus 140 of the present embodiment after reception of a positional information setting request with reference to FIG. 6. More specifically, the processing is executed by the image forming apparatus 140 when a user presses the positional information setting execution key on the positional information setting screen (FIG. 5C) described with reference to FIG. 5. In the following description of processing with reference to FIG. 6, "?nft=281868ecf797" which is transmitted to the information processing apparatus 110 by the image forming apparatus 140 and is stored in the image forming apparatus 140 for a predetermined time is called as "access permission information". Also, "?nft=281868ecf797" which is transmitted to the image forming apparatus 140 by the information processing apparatus 110 is called as an "access permission query string". Also, the processing for setting positional information is realized by reading out a program which is stored in the control unit 141 and functions as a built-in Web server program by the CPU 221 to the RAM and analyzing and executing the read program.

In step S601, when a user presses the positional information setting execution key, the control unit 141 receives an HTTP request and analyzes the HTTP request. In step S602, the control unit 141 determines whether or not the access permission query string is added to the HTTP request as a result of analysis in step S601. When the access permission query string is added to the HTTP request, the control unit 141 executes processing in step S603. When the access permission query string is not added to the HTTP request, the control unit 141 executes processing in step S608. In step S603, the control unit 141 reads out access permission information stored in the image forming apparatus 140. In step S604, the control unit 141 determines whether or not there is access permission information in processing for reading out access permission information in step S603. When there is access permission information, the control unit 141 executes processing in step S605. When there is no access permission information, the control unit 141 executes processing in step S608. In step S605, the control unit 141 compares the access permission query string with access permission information. If matched, the control unit 141 executes processing in step S607. In other words, the control unit 141 functions as a determination unit that determines whether or not the access from an information processing apparatus is permitted based on access permission information included in access information when the information processing apparatus accesses an image forming apparatus using access information. If not matched, the control unit 141 executes processing in step S608. In step S607, the control unit 141 transmits the positional information setting screen (FIG. 5C) and JavaScript (registered trademark) to the information processing apparatus 110 as a response. In other words, the control unit 141 functions as a provision unit that provides a setting screen to an information processing apparatus when it is determined that the access from the information processing apparatus is permitted. When it is determined as NO in step S602, step S604, and step S608, the control unit 141 sends the positional information reference screen (FIG. 5D) serving as a default screen as a response to the information processing apparatus 110.

Next, a description will be given by taking another example of the flow of operations described with reference to FIG. 5 up until the information processing apparatus 110 sets positional information by imaging the two-dimensional barcode with reference to FIG. 7. In the barcode imaging screen (FIG. 7A) displayed on the display unit 113 of the information processing apparatus 110, a user takes a picture of the two-dimensional barcode image displayed on the operation unit 142 of the image forming apparatus 140 described with reference to the positional information setting screen shown in FIG. 3C using the camera unit 114. Alternatively, a user takes a picture of the two-dimensional barcode image printed by the printer unit 143 of the image forming apparatus 140 using the camera unit 114. When the control unit 111 of the information processing apparatus 110 successfully analyzes the photographed barcode via the camera unit 114, the display unit 113 displays URL information on the barcode analysis result display screen (FIG. 7B) and requests a user to access the URL.

When a user presses URL information on the barcode analysis result display screen (FIG. 7B) displayed on the display unit 113, the operation unit 112 receives access permission to pass the URL information to the control unit 111. Then, the control unit 111 of the information processing apparatus 110 accesses the positional information setting screen that is indicated by the URL and is provided by the control unit 141 of the image forming apparatus 140. At this time, the information processing apparatus 110 acquires positional information from the GPS 228 and then transmits the positional information to the image forming apparatus 140.

The control unit 141 of the image forming apparatus 140 confirms whether or not the access permission query string received from the information processing apparatus 110 is valid. The control unit 141 functions as a setting unit that sets the positional information transmitted from the information processing apparatus 110 as positional information about the image forming apparatus when the query string is valid. Also, the control unit 141 functions as a reception unit that receives positional information from an information processing apparatus that has acquired the positional information about the information processing apparatus in response to the selection of settings for the positional information via the setting screen displayed through access using access information. Then, the control unit 141 generates a positional information setting execution screen (FIG. 7C) indicating the setting results and sends the generated screen as a response to the information processing apparatus 110. Also, when the access permission query string is invalid, the control unit 141 sends a positional information setting execution failure screen (FIG. 7D) as a response to the information processing apparatus 110. Also, when the control unit 111 of the information processing apparatus 110 fails to analyze the photographed barcode, the control unit 141 sends a barcode analysis failure screen (FIG. 7E) as a response.

In the aforementioned processing, the image forming apparatus 140 transmits the screen shown in FIG. 5C together with JavaScript (registered trademark) to the information processing apparatus 110 due to access to the URL by the information processing apparatus 110. However, the screen for prompting positional information setting execution is not necessarily transmitted. The image forming apparatus 140 transmits JavaScript (registered trademark) without sending the screen to the information processing apparatus 110 due to access to the URL by the information processing apparatus 110. Then, the image forming apparatus 140 receives positional information from the information processing apparatus 110 that has acquired the positional information and then transmits the positional information setting completion screen shown in FIG. 5E to the information processing apparatus 110. In this manner, a user can set positional information to the image forming apparatus 140 only by accessing to the URL, resulting in an improvement in usability.

According to the information processing apparatus of the first embodiment, when a user reads a two-dimensional barcode by the information processing apparatus 110, the user can acquire positional information about the information processing apparatus 110 and automatically set the acquired positional information as positional information about the image forming apparatus 140. In other words, according to the information processing apparatus of the present invention, a user can readily register positional information about an image forming apparatus in the image forming apparatus without providing a position information management server or installing GPS to the image forming apparatus by a vendor. Thus, there is no need for a vendor to prepare a GPS function to an image forming apparatus provided thereby or to prepare a server, resulting in an improvement in cost performance. In addition, a user can register the position of an image forming apparatus in the image forming apparatus in a simple operation, resulting in an improvement in usability.

(Second Embodiment)

In the second embodiment, a description will be given of a configuration in which the information processing apparatus 110 acquires the positional information setting URL of the image forming apparatus 140 using Multicast DNS (hereinafter referred to as "mDNS"). In the second embodiment, the information processing apparatus 110 automatically acquires the positional information setting URL of the image forming apparatus 140 using mDNS which is a standard service search protocol without imaging a barcode image.

A description will be given of the flow of processing when the image forming apparatus 140 of the present embodiment receives an mDNS service discovery with reference to FIG. 8. In step S801, the control unit 141 of the image forming apparatus 140 receives an mDNS service discovery as a search request. In step S802, the control unit 141 of the image forming apparatus 140 generates access permission information associated with a random expiration date/time. In step S803, the control unit 141 of the image forming apparatus 140 generates a character string in which the access permission information generated in step S802 is added as a query string to the URL indicating a positional information setting screen. In step S804, the control unit 141 of the image forming apparatus 140 sets the generated character string in step S803 to an mDNS adminurl key and transmits the mDNS adminurl key as an mDNS response to the information processing apparatus 110. After elapse of a predetermined time, the control unit 141 of the image forming apparatus 140 deletes the generated access permission information in step S805. The URL indicating a setting screen for setting an image forming apparatus is normally set in an mDNS adminurl key.

Figure 9A:
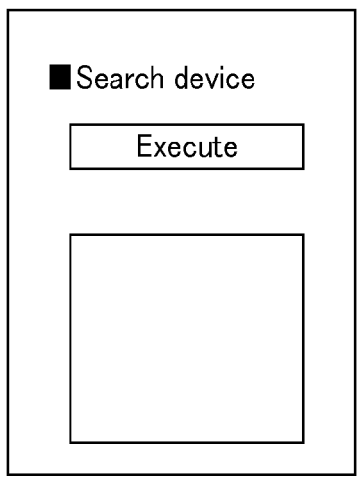
FIGS. 9A to 9F illustrate screen transition in a terminal device for searching an image forming apparatus and setting positional information.
Figure 9B:
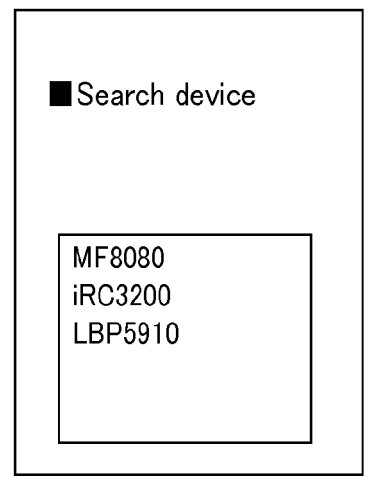

A description will be given of the flow of processing up until the setting of positional information after the information processing apparatus 110 of the present embodiment searches an image forming apparatus using mDNS with reference to FIG. 9. When a user presses an execution key on a device search screen (FIG. 9A) displayed on the display unit 113 of the information processing apparatus 110, the control unit 111 executes device search via the operation unit 112. Upon completion of device search, the control unit 111 causes the display unit 113 to display a list of searched devices on a device search screen (FIG. 9B). When a user selects a desired device from a list of devices via the operation unit 112, the information processing apparatus 110 accesses a positional information setting screen (FIG. 9C) provided by the control unit 141 of the selected image forming apparatus 140. Note that the display format of the device search screen (FIG. 9B) is the same as that of a printer selection screen displayed upon pressing a "print button". However, the device search screen according to the second embodiment is assumed to be a screen which is displayed in response to pressing of a "button for setting positional information to an image forming apparatus" or a "button for searching an image forming apparatus". Of course, a positional information setting screen to be described below may also by displayed by pressing a "print button", usability when a user uses a print function is reduced. It is preferable that printout and positional information settings are separated.

Figure 9C:
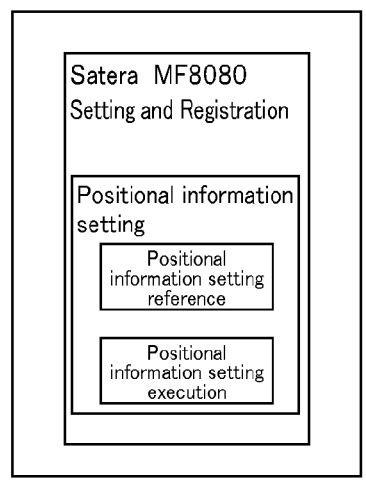
Figure 9D:
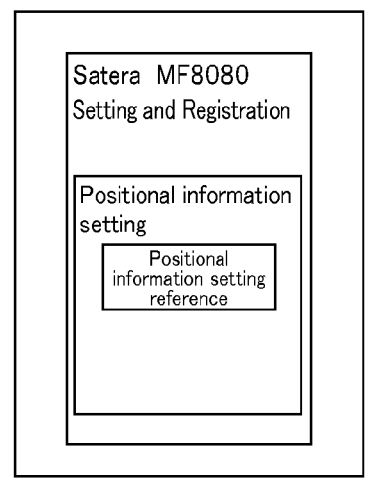
Figure 9E:
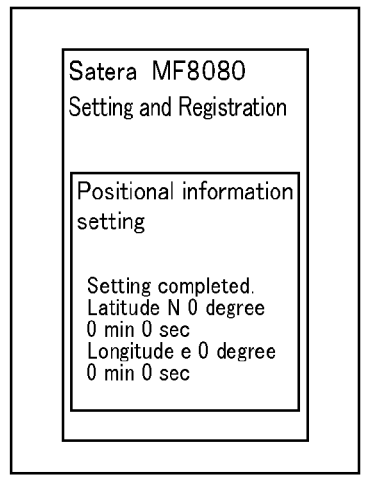
Figure 9F:
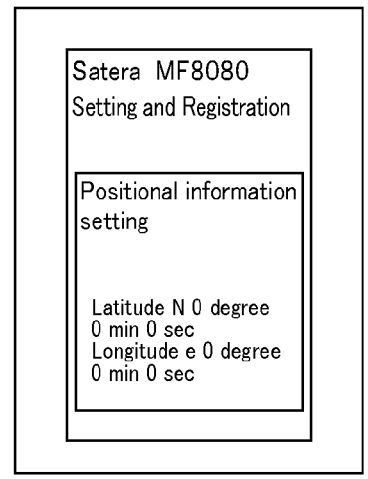

In the present embodiment, a description will be given by taking an example in which an MF 8080 device is selected. At this time, the control unit 141 of the image forming apparatus 140 confirms whether or not the access permission query string received from the information processing apparatus 110 is valid. When the access permission query string is valid, the control unit 141 sends the positional information setting screen (FIG. 9C) as a response to the information processing apparatus 110, whereas when the access permission query string is invalid, the control unit 141 sends a positional information reference screen (FIG. 9D) as a response to the information processing apparatus 110. The display unit 113 displays a positional information setting reference key and a positional information setting execution key on the positional information setting screen (FIG. 9C).

When a user presses the positional information setting reference key via the operation unit 112, the control unit 111 acquires positional information using the GPS 228, and a positional information reference screen (FIG. 9F) is sent as a response to the information processing apparatus 110. When a user presses the positional information setting execution key, the control unit 111 acquires positional information using the GPS 228 and then transmits the acquired positional information to the image forming apparatus 140. The image forming apparatus 140 sets the received positional information as positional information about the image forming apparatus and sends a positional information setting completion screen (FIG. 9E) indicating the setting results as a response to the information processing apparatus 110. The display unit 113 only displays the positional information setting reference key on the positional information reference screen (FIG. 9D) when access permission information is invalid so that a user cannot execute the positional information setting. While, in the second embodiment, the positional information setting screen is displayed, the present invention is not limited thereto. For example, the positional information setting may also be added as one of remote UI items for confirming the state of an image forming apparatus and/or a job introduced into an image forming apparatus. The URL to be transmitted from an image forming apparatus in this case is a URL of the remote UI. The positional information setting may also be added as one of UI items dedicated for a driver-less print service provided by an image forming apparatus. The driver-less print service is a service that establishes wireless communication between an information processing apparatus and an image forming apparatus and causes the information processing apparatus in which a driver for controlling the image forming apparatus is not installed to transmit print data to the image forming apparatus for printout. The UI dedicated for a driver-less print service is a UI for making settings required for using the driver-less print service and confirming information relating to the driver-less print service.

Figure 10:
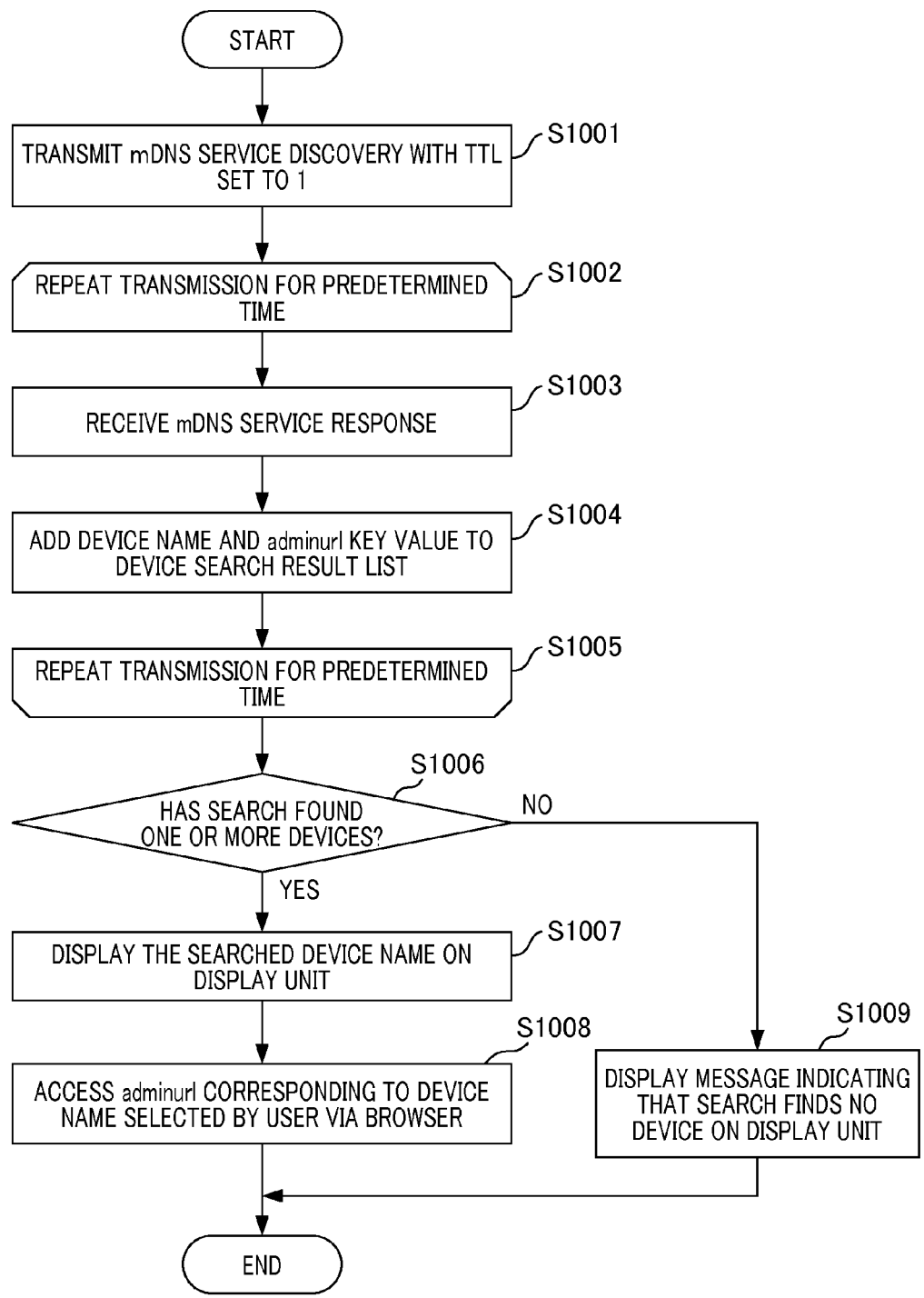
FIG. 10 illustrates processing for accessing a positional information setting screen by a terminal device using mDNS.

A description will be given of the flow of processing from searching an image forming apparatus using mDNS by the information processing apparatus 110 of the present embodiment to accessing to a setting screen for setting positional information about the image forming apparatus 140 with reference to FIG. 10. In step S1001, the control unit 111 of the information processing apparatus 110 transmits an mDNS service discovery by setting a multicast TTL (Time to live) setting to 1. In multicast with TTL set to 1, an electric wave reaching range is limited to a local network, and thus, it can be estimated that a device to be searched is at a location that is physically close to the information processing apparatus 110.

In step S1002, the control unit 111 repeats transmission of an mDNS service discovery for a predetermined time. In step S1003, the control unit 111 receives an mDNS service response. In this case, in step S1004, a device name and an adminurl key value are added to a device search result list. The control unit 111 repeats the processing in steps S1003 and S1004 for a predetermined time. After elapse of a predetermined time, the control unit 111 determines in step S1006 whether or not a search finds one or more image forming apparatuses. When a search finds one or more image forming apparatuses, in step S1007, the control unit 111 displays the searched device names on the display unit 113. When a user selects a desired image forming apparatus 140 from the displayed list of devices in step S1007, the control unit 111 accesses an adminurl corresponding to the device name selected by a user via a browser in step S1008. When a search does not find one or more image forming apparatuses in step S1006, the control unit 111 of the information processing apparatus 110 displays a message indicating that a search finds no device on the display unit 113 in step S1009.

A description will be given of a device search result list that manages the device search results obtained by using mDNS by the information processing apparatus 110 of the present embodiment with reference to FIG. 11. In this example, the list indicates that a search finds three devices that are an MF 8080 (1101), an iRC 3200 (1102), and an LBP 5910 (1103). The value of adminurl sent as a response to mDNS by each image forming apparatus is also managed by the list. The subsequent processing in the second embodiment is the same as that shown in FIG. 6 in the first embodiment.

(Third Embodiment)

In the third embodiment, a description will be given of a configuration in which the information processing apparatus 110 reports and sets positional information about the image forming apparatus 140 via NFC. In the third embodiment, the image forming apparatus 140 can automatically and accurately acquire positional information by acquiring positional information from the information processing apparatus 110 via NFC, where NFC is near field communication within a length of ten centimeters or so. Thus, it can be ensured that the devices which are connected to each other via NFC are at a physically close location.

A description will be given of the positional information setting operation performed by the operation unit 142 of the image forming apparatus 140 of the present embodiment with reference to FIG. 12. When a user selects the positional information setting on a system management setting screen (FIG. 12A), the screen displayed on the operation unit 142 transits to a positional information setting screen (FIG. 12B). At this time, the control unit 141 of the image forming apparatus 140 sets the NFC interface 213 in a data reception waiting state. When a user causes the information processing apparatus 110 to touch an NFC reader of the image forming apparatus 140, an NFC interface 229 of the information processing apparatus 110 transmits positional information about the information processing apparatus 110 to the image forming apparatus 140 via NFC. When the image forming apparatus 140 receives positional information, the image forming apparatus 140 sets the transmitted positional information as positional information about the image forming apparatus 140 and displays a positional information setting screen (FIG. 12C) on the operation unit 142. When the image forming apparatus 140 does not receive positional information within a predetermined time, the image forming apparatus 140 displays a positional information setting failure screen (FIG. 12D) on the operation unit 142.

Next, a description will be given of the flow of operations performed by the information processing apparatus 110 of the present embodiment up until the information processing apparatus 110 reports and set positional information about the image forming apparatus 140 via NFC with reference to FIG. 13.

Firstly, when the display unit 113 of the information processing apparatus 110 displays positional information setting screen (FIG. 13A) of an image forming apparatus, the NFC interface 229 of the information processing apparatus 110 becomes in a positional information transmission waiting state via NFC. When a user causes the information processing apparatus 110 to touch the NFC reader of the image forming apparatus 140, the NFC interface 229 of the information processing apparatus 110 transmits positional information about the information processing apparatus 110 to the image forming apparatus 140 via NFC. When data transmission using NFC is successfully completed, the information processing apparatus 110 displays the positional information completion screen (FIG. 13B) on the display unit 113. When data transmission using NFC is failed, the information processing apparatus 110 displays the positional information setting failure screen (FIG. 13C) on the display unit 113.

Next, a description will be given of the flow of processing for setting positional information by the image forming apparatus 140 of the present embodiment after reception of a positional information setting request via NFC with reference to FIG. 14. More specifically, the processing is executed by the image forming apparatus 140 when a user causes the information processing apparatus 110 to touch the NFC reader of the image forming apparatus 140 according to the positional information setting screen (FIG. 13A) described with reference to FIG. 13.

In step S1401, the NFC interface 213 waits for receiving NFC data for a predetermined time. After reception of NFC data or after elapse of a predetermined time, the control unit 141 of the image forming apparatus 140 determines whether or not NFC data has been received in step S1402. When the control unit 141 determines that NFC data has been received, the control unit 141 reads out latitude/longitude information from the received NFC data in step S1403. In step S1404, the latitude/longitude information read out by the control unit 141 is set as positional information about the image forming apparatus 140. In step S1405, transmits information indicating positional information completion to the information processing apparatus 110. Alternatively, the control unit 141 displays a screen such as the positional information completion screen (FIG. 13B) on the operation unit 142. On the other hand, when the control unit 141 determines in step S1402 that no NFC data has been received, the control unit 141 transmits information indicating positional information setting failure to the information processing apparatus 110 in step S1406. Alternatively, the control unit 141 displays a screen such as the positional information setting failure screen (FIG. 13C) on the operation unit 142. While, in the third embodiment, a description has been given by taking an example of NFC as near field communication, the present invention is not limited thereto but any near field communication such as Bluetooth (registered trademark), TransferJet, or the like may also be used.

According to the information processing apparatus described in the first, second, and third embodiments, a user can readily set positional information about an image forming apparatus to the image forming apparatus. When positional information is set to an image forming apparatus, a user can know the physical location of the image forming apparatus upon searching the image forming apparatus on a network using mDNS or the like. In this manner, if an information processing apparatus is provided with, for example, a display function that displays an image forming apparatus on a map, a system for displaying the searched image forming apparatus on the map can be provided so that a highly convenient print system can be provided.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-142865 filed on Jun. 26, 2012, which is hereby incorporated by reference herein in its entirety.

What is claimed is:

1. An information processing apparatus comprising:
a display unit configured to receive a setting screen for setting positional information about an image forming apparatus from the image forming apparatus and display the setting screen;
an acquisition unit configured to acquire positional information about an information processing apparatus in response to the selection of settings for the positional information via the setting screen by a user; and
a transmission unit configured to transmit the acquired positional information about the information processing apparatus to the image forming apparatus,
wherein the acquisition unit acquires access information including access permission information for permitting access to the image forming apparatus that provides the setting screen,
wherein, when the display unit accesses the setting screen using the access information acquired by the acquisition unit, the display unit receives the setting screen from the image forming apparatus that has permitted access based on the access permission information included in the access information and displays the setting screen, and
wherein, when the transmission unit transmits positional information about the information processing apparatus to the image forming apparatus, the positional information about the information processing apparatus is set as the positional information about the image forming apparatus to the image forming apparatus.

2. The information processing apparatus according to claim 1, wherein the acquisition unit acquires the access information for accessing the setting screen by reading an embedded image or confirming information included in a response from the image forming apparatus to a search request for searching the image forming apparatus.

3. The information processing apparatus according to claim 1, wherein an expiration date/time is set to the access permission information.

4. The information processing apparatus according to claim 1, wherein the acquisition unit further acquires a script including an instruction such that the information processing apparatus acquires the positional information about the information processing apparatus in response to the selection of settings for the positional information by a user and transmits the acquired positional information to the image forming apparatus, and
wherein the transmission unit transmits the positional information about the information processing apparatus, which has been acquired by executing the script, to the image forming apparatus.

5. An image forming apparatus comprising:
a generation unit configured to generate access information for accessing a setting screen for setting positional information about the image forming apparatus, wherein the access information includes access permission information for permitting access to the image forming apparatus that provides the setting screen;
a determination unit configured to determine whether or not to permit access from the information processing apparatus based on the access permission information included in the access information when the information processing apparatus accesses the image forming apparatus using the access information;
a provision unit configured to provide the setting screen to the information processing apparatus when the determination unit determines to permit access from the information processing apparatus;
a reception unit configured to receive the positional information about the information processing apparatus from the information processing apparatus that has acquired the positional information in response to the selection, by a user, of settings for the positional information via the setting screen displayed through access using the access information; and
a setting unit configured to set the received positional information about the information processing apparatus as the positional information about the image forming apparatus.

6. The image forming apparatus according to claim 5, wherein the generation unit generates and outputs an embedded image including the access information, and
wherein the determination unit determines whether or not to permit access from the information processing apparatus based on the access permission information included in the access information which is acquired by the information processing apparatus reading the embedded image.

7. The image forming apparatus according to claim 5, wherein, when the generation unit receives a search request for searching the image forming apparatus from the information processing apparatus, the generation unit generates the access information and sends the generated access information as a response to the information processing apparatus.

8. The image forming apparatus according to claim 5, wherein the provision unit provides, to the information processing apparatus, both the setting screen and a script including an instruction such that the information processing apparatus acquires the positional information about the information processing apparatus in response to the selection of settings for the positional information by the user and transmits the acquired positional information to the image forming apparatus, and
wherein the reception unit receives the positional information about the information processing apparatus from the information processing apparatus that has acquired the positional information by executing the script.

9. A method for controlling a printing system that comprises an image forming apparatus for executing printout and an information processing apparatus for transmitting print instruction to the image forming apparatus via a network, the method comprising:
generating, by the image forming apparatus, access information for accessing a setting screen for setting positional information about the image forming apparatus, wherein the access information includes access permission information for permitting access to the image forming apparatus that provides the setting screen;
determining, by the image forming apparatus, whether or not to permit access from the information processing apparatus based on the access permission information included in the access information when the information processing apparatus accesses the image forming apparatus using the access information;
providing, by the image forming apparatus, a screen for setting positional information about the image forming apparatus to the information processing apparatus when the determining step determines to permit access from the information processing apparatus;
receiving, by the information processing apparatus, the screen for setting positional information about the image forming apparatus from the image forming apparatus and displaying the screen;

acquiring, by the information processing apparatus, positional information about an information processing apparatus in response to the selection of settings for the positional information via the screen by a user;

transmitting, by the information processing apparatus, the acquired positional information about the information processing apparatus to the image forming apparatus;

receiving, by the image forming apparatus, the positional information about the information processing apparatus from the information processing apparatus that has acquired the positional information in response to the selection of settings for the positional information via the screen by the user; and setting, by the image forming apparatus, the received positional information about the information processing apparatus as the positional information about the image forming apparatus.

10. A non-transitory storage medium on which is stored a computer program for making a computer execute a method for controlling a printing system that comprises an image forming apparatus for executing printout and an information processing apparatus for transmitting print instruction to the image forming apparatus via a network, the method comprising:

generating, by the image forming apparatus, access information for accessing a screen for setting positional information about the image forming apparatus, wherein the access information includes access permission information for permitting access to the image forming apparatus that provides the screen, determining, by the image forming apparatus, whether or not to permit access from the information processing apparatus based on the access permission information included in the access information when the information processing apparatus accesses the image forming apparatus using the access information;

providing, by the image forming apparatus, a screen for setting positional information about the image forming apparatus to the information processing apparatus when the determining step determines to permit access from the information processing apparatus;

receiving, by the information processing apparatus, the screen for setting positional information about the image forming apparatus from the image forming apparatus and displaying the screen;

acquiring, by the information processing apparatus, positional information about an information processing apparatus in response to the selection of settings for the positional information via the screen by a user;

transmitting, by the information processing apparatus, the acquired positional information about the information processing apparatus to the image forming apparatus;

receiving, by the image forming apparatus, the positional information about the information processing apparatus from the information processing apparatus that has acquired the positional information in response to the selection of settings for the positional information via the screen by a user; and setting, by the image forming apparatus, the received positional information about the information processing apparatus as the positional information about the image forming apparatus.

* * * * *